US008083982B2

(12) United States Patent
Kirchhoff et al.

(10) Patent No.: US 8,083,982 B2
(45) Date of Patent: Dec. 27, 2011

(54) METHOD FOR REPAIRING A PROTECTIVE LINING OF AN INDUSTRIAL REACTION OR TRANSPORT VESSEL

(75) Inventors: Stefan Kirchhoff, Dortmound (DE); Dieter Blissenbach, Moers (DE); Rolf Lamm, Aachen (DE)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 1416 days.

(21) Appl. No.: 10/525,686

(22) PCT Filed: May 21, 2003

(86) PCT No.: PCT/EP03/05332
§ 371 (c)(1),
(2), (4) Date: Feb. 22, 2005

(87) PCT Pub. No.: WO03/100336
PCT Pub. Date: Dec. 4, 2003

(65) Prior Publication Data
US 2005/0263945 A1 Dec. 1, 2005

(30) Foreign Application Priority Data
May 24, 2002 (DE) .................................. 102 23 284

(51) Int. Cl.
*G01B 11/00* (2006.01)
(52) U.S. Cl. ............ 264/409; 425/11; 425/13; 264/36.1
(58) Field of Classification Search .................. 264/409, 264/36.1; 425/11, 13
See application file for complete search history.

(56) References Cited

U.S. PATENT DOCUMENTS 3,469,030 A * 9/1969 Priebe ........................... 348/203
(Continued)

FOREIGN PATENT DOCUMENTS

EP 0121617 A1 10/1984
(Continued)

*Primary Examiner* — Joseph Del Sole
*Assistant Examiner* — David N Brown, II
(74) *Attorney, Agent, or Firm* — Derek S. Jessen; Leon Nicohosian, Jr.

(57) ABSTRACT

The present invention relates to a method for repairing a protective lining of an industrial reaction or transport vessel, such as a converter vessel, electric arc furnace, or ladle. The method comprises identifying combined areas of the lining having a thickness below a predetermined threshold value by means of a measuring device, which measuring device measures the residual thickness of the lining and a processing unit, which processing unit in a first step transforms the residual thickness data into binary data, by comparing the measured residual thickness data with the predetermined threshold value for the thickness of the lining, and assigning the binary value "1" to areas of the lining having a thickness below the pre-determined threshold value, and the binary value "0" to areas of the lining having a thickness equal or higher than the pre-determined threshold value, or vice versa, in a second step combines isolated areas of the lining having a thickness below the predetermined threshold value into combined areas of the lining to which the binary value for areas of the lining having a thickness below the pre-determined threshold value is assigned, and in a third step computes the position and repair sequence of each of the combined areas and transfers these data to a repair device, and applying monolithic lining material onto the combined areas computed by the processing unit by means of a repair device.

15 Claims, 3 Drawing Sheets

U.S. PATENT DOCUMENTS

Figure 1:
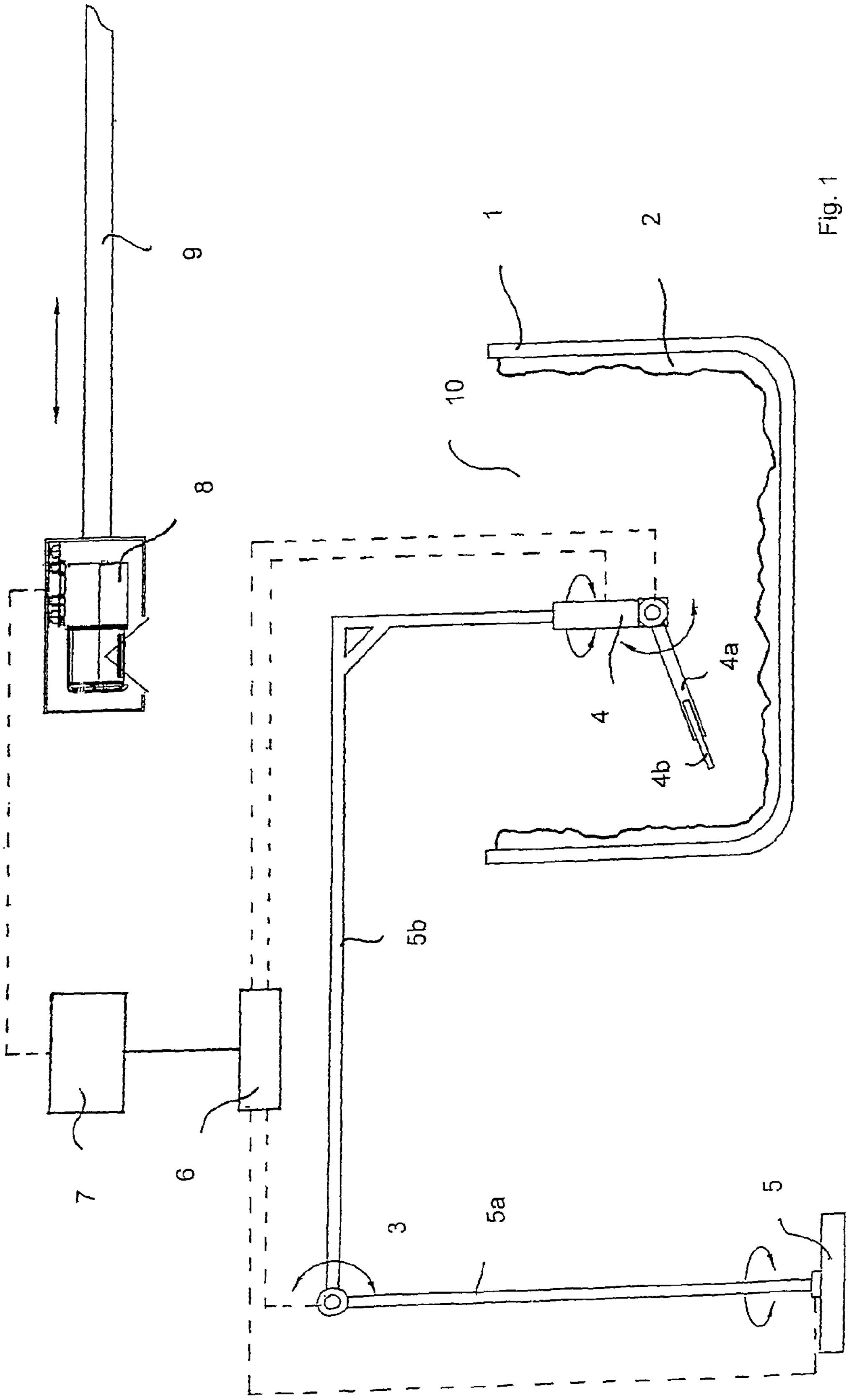

| | | | | | |
|---|---|---|---|---|---|
| 3,716,316 | A * | 2/1973 | Dekker et al. | 425/13 |
| 3,827,633 | A * | 8/1974 | Kouno et al. | 239/132.3 |
| 3,917,170 | A * | 11/1975 | Marino | 239/132.3 |
| 4,019,130 | A | 4/1977 | Sakamoto et al. | |
| 4,107,244 | A * | 8/1978 | Ochiai et al. | 264/30 |
| 4,227,802 | A * | 10/1980 | Scholdstrom et al. | 356/5.15 |
| 4,272,018 | A * | 6/1981 | Hickson | 239/8 |
| 4,649,858 | A | 3/1987 | Sakai et al. | |
| 4,688,773 | A * | 8/1987 | Legille et al. | 266/281 |
| 4,690,328 | A * | 9/1987 | Roehl | 239/227 |
| 4,860,422 | A * | 8/1989 | Marino | 29/402.18 |
| 4,913,649 | A * | 4/1990 | van der Hoeff | 432/3 |
| 5,127,736 | A * | 7/1992 | Neiheisel | 356/602 |
| 5,178,329 | A * | 1/1993 | Yang | 239/227 |
| 5,212,738 | A | 5/1993 | Chande et al. | |
| 5,419,922 | A * | 5/1995 | Bajek | 427/140 |
| 5,523,685 | A * | 6/1996 | Kasai et al. | 324/229 |
| 5,695,558 | A * | 12/1997 | Eastwood | 118/308 |
| 5,792,393 | A * | 8/1998 | Smirnoff | 264/30 |
| 6,034,345 | A * | 3/2000 | Firestone | 219/98 |
| 2002/0158368 | A1* | 10/2002 | Wirth, Jr. | 264/409 |

FOREIGN PATENT DOCUMENTS

SU 1632978 A1 3/1991

* cited by examiner

METHOD FOR REPAIRING A PROTECTIVE LINING OF AN INDUSTRIAL REACTION OR TRANSPORT VESSEL

BACKGROUND OF INVENTION

The present invention relates to a method for repairing a protective lining of an industrial reaction or transport vessel, such as a converter vessel, electric arc furnace, or ladle, e.g. steel casting ladle, pig iron ladle, torpedo ladle or slag ladle. In particular, the present invention relates to a method for repairing a protective lining of an industrial reaction or transport vessel, wherein areas of the lining having a thickness below a pre-determined threshold value are identified and monolithic lining material is applied onto those areas.

Industrial reaction or transport vessels, such as blast furnaces, electric arc furnaces, ladles or converters, are e.g. used for metallurgical purposes such as for producing steel. These vessels generally have a protective lining at their inner surface, which protects the outer metallic surface of the vessel from being damaged by the heat or reaction conditions inside the vessel. However, the protective lining is subjected to wear during the use of the vessels and must be repaired from time to time to ensure high operational safety.

For this purpose, the residual thickness of the protective lining is measured between the individual phases of use of the vessel, when the vessel is empty. The residual thickness data obtained by this measurement are used to determine the areas of the lining which have to be repaired.

International Patent Application WO 01/38900 A1 discloses a non-contacting measuring procedure for measuring the residual thickness of the refractory lining of a metallurgical vessel. The method comprises sweeping a laser beam from a measuring device over the inner surface of the metallurgical vessel, i.e. the surface of the refractory lining, and measuring the angle and the distance between measuring device and inner surface of the vessel at various points. The measuring device preferably includes a laser diode operating in a pulse mode as a transmitting device and a photodiode as a receiving device. The thus obtained data allow to image the surface structure of the refractory lining in the form of a three-dimensional thickness profile. WO 01/38900 A1 suggests that the measuring device is physically associated with a device which applies new lining material to the inside surface of the vessel.

However, the lining material is generally applied manually to the inside surface of the vessel, either by means of an operator holding a repair device or by means of a repair device which is manually manipulated by an operator via a remote. In both cases the operator must be able to visibly identify the areas to be repaired and follow the movements of the repair device. Therefore, the operator has to be relatively close to the open-end of the vessel to be repaired. This is connected with several drawbacks. The operator is exposed to heat, fire, rebound of new lining material and other parts falling off the vessel. Furthermore, there is the danger of explosion in the vessels, if the hot material gets into contact with water, which may cause harm to the operator, if the operator is close to the vessel.

Moreover, the manual method is inherently connected with human errors. For instance, if the operator misses the right spot to be repaired, e.g. by a few centimeters, there is the danger of causing a so called "breakthrough", which is a hole in the wall of the vessel, and may harm the operator of the vessel or damage the equipment connected with the vessel or even lead to explosions if the material flowing out of the vessel comes in contact with water. This may be a problem because it is difficult to visibly identify the areas to be repaired if the protective lining is entirely monolithic, and the operator can only obtain a rough guidance by the measurement of the thickness profile carried out before.

If the operator actually holds the repair device, the output of new lining material is generally limited. Furthermore, because of the heat, repair time under control of an operator is generally limited to 10 to 15 minutes.

Accordingly it would be highly desirable to provide a method for repairing a refractory lining of a metallurgical vessel which is more accurate than the methods according to the state of the art, using less material and which eliminates the operational dangers mentioned before.

SUMMARY OF INVENTION

It is an object of the present invention to provide a method for repairing a monolithic lining of an industrial reaction or transport vessel which can be performed automatically, at high speed and high accuracy.

It is another object of the present invention to provide a method for repairing a monolithic lining of an industrial reaction or transport vessel where the operational dangers are eliminated.

It is a further object of the present invention to provide a method for repairing a monolithic lining of an industrial reaction or transport vessel which uses lining material more effectively.

It is a still further object of the present invention to provide a method for repairing a monolithic lining of an industrial reaction or transport vessel which is easily adaptable to operational requirements.

In its broadest aspect, the present invention provides a method for repairing a protective lining of an industrial reaction or transport vessel including the steps of identifying combined areas of the lining having a thickness below a pre-determined threshold value by means of a measuring device, which measuring device measures the residual thickness of the lining and a processing unit, which processing unit in a first step transforms the residual thickness data into binary data, by comparing the measured residual thickness data with the pre-determined threshold value for the thickness of the lining, and assigning the binary value "1" to areas of the lining having a thickness below the pre-determined threshold value, and the binary value "0" to areas of the lining having a thickness equal or higher than the pre-determined threshold value, or vice versa, in a second step combines isolated areas of the lining having a thickness below the pre-determined threshold value into combined areas of the lining to which the binary value for areas of the lining having a thickness below the predetermined threshold value is assigned, and in a third step computes the position and repair sequence of each of the combined areas and transfers these data to a repair device, and applying monolithic lining material onto the combined areas computed by the processing unit by means of a repair device.

DETAILED DESCRIPTION OF THE INVENTION

For actual performance of the repair, a repair device is provided which applies new lining material onto the damaged areas of the lining and which preferably includes a manipulator arm and a gunning nozzle which is disposed thereon and is rotatable, tiltable, vertically movable, and optionally horizontally movable. The position and operation of the repair device is controlled by a processing unit which transfers the actual residual thickness data obtained by means of the measuring device to the repair device in the form of repairing instructions. The processing unit is preferably electronically connected with both, the measuring device and the repair device.

The present method includes number of processing steps for transferring the actual residual thickness data obtained by means of the measuring device to the repair device in the form of repair instructions. The residual thickness data are preferably sorted with reference to a regular grid which reflects the symmetry of the vessel. Since the preferred metallurgical vessels have a basic shape which substantially is in the form of a cylinder the residual thickness data are preferably converted into matrices and cylinder coordinates. If the vessel has a rectangular horizontal cross section, the residual thickness data are preferably converted into matrices and cartesian coordinates.

The processing steps include transforming the residual thickness data into binary data, by comparing the residual thickness data with the pre-determined threshold value for the thickness of the lining, and e.g. assigning the binary value "1" to areas of the lining having a thickness below the pre-determined threshold value, and the binary value "0" to areas of the lining having a thickness equal or higher than the pre-determined threshold value, hereinafter referred to as "binarization".

To reduce the amount of data to be processed, before binarization, the three-dimensional residual-thickness data obtained by the measuring device of a number of points in the vessel may preferably be averaged in the processing unit, in a first processing step referred to as "averaging".

After binarization, isolated areas of the lining having a thickness below the pre-determined threshold value are combined into adjacent combined areas of the lining to which the binary value for areas of the lining having a thickness below the pre-determined threshold value is assigned, which processing step is hereinafter referred to as "defragmentation". For achieving this, the binary values of a number of areas are preferably compared with each other, and, if the number of areas of the lining having a thickness below the pre-determined threshold value exceeds a pre-selected ratio, the whole compared area is assigned the binary value for areas having a thickness below the pre-determined threshold value. Thereby the fact is accepted that areas of the lining having a thickness equal or higher than the pre-determined threshold value adjacent to areas of the lining having a thickness below the pre-determined threshold value will be sprayed on with new lining material as well, although these areas do not require a repair yet. A preferred ratio is e.g. from about 30 percent to about 80 percent, most preferably from about 50 percent to about 60 percent.

The defragmentation can be carried out using different degrees of defragmentation. Preferably, the degree of defragmentation is varied as a function of the production-related boundary conditions such as the uniformity in reconstituting the refractory lining, mass of the relining compound, and time of repair.

Finally, the position and repair sequence of each of the combined areas is computed and converted into repair instructions for the repair device in a further processing step. Therefore, each computed area having the binary value for areas having a thickness below the pre-determined threshold value is associated with a consecutive number representing the sequence of steps of application of monolithic lining material. This processing step is hereinafter referred to as "sequencing". The sequence is preferably selected, taking into account the static characteristics and the curing behavior of the repair material that is applied onto the inner surface of the monolithic lining, in particular the curing time of the repair material. In particular, the preferred sequence takes into account that the refractory lining has to be repaired from the lower sections of the metallurgical vessel to its upper sections. Thereby the repair material, if applied in form of horizontal strips to the repair areas, is supported by the relining compound applied in adjacent lower sections before.

In a particularly preferred aspect of the invention, the residual-thickness data are processed to obtain repair data in such a way that the shape of each area to be repaired, as seen towards the surface of the refractory lining, is enlarged into a simple geometrical basic shape, preferably a rectangle. Thereby the working speed of the repair device may be further increased.

In a further particularly preferred aspect of the invention, the orientation and form of the geometrical basic shape is adapted, in the processing unit, to the existing axes of motion of the repair device, which is preferably a spraying, a gunning or a shotcreting device and the like. With this adaptation the repair device can be moved along its existing axes of motion in order to perform the repair of the refractory lining. Thereby the working speed of the repair device is increased and the repair device is easier to control. This processing step is preferably carried out after defragmentation, and is hereinafter referred to as "segmentation".

In a further preferred aspect of the present invention, prior to determining the sequence of steps of application of monolithic lining material, the steps of binarization, defragmentation, and optionally segmentation are carried out again under variation of the threshold value, so that deeper holes may be repaired in multiple repair steps by applying a multiplicity of layers of monolithic lining material.

In a still further, particularly preferred aspect, prior to a transfer of the repair data to the repair device, the result of the repair is represented in the processing unit by means of a simulation under consideration of specific operational parameters such as the time of repair, and amount of the repair compound. Thus, the operator of the processing unit may easily adapt the repair procedure to varying conditions.

It is particularly preferred that, after completion of the spraying step, the residual thickness of the refractory lining is once again measured by the measuring device and the thus obtained residual thickness data are compared with data obtained by a simulation regarding the achievable reconstitution of the refractory lining, and in case of a deviation between the newly measured residual thickness data and the simulation data, the control unit of the repair device is calibrated accordingly. Alternatively, a further repair step may be started.

Figure 2:
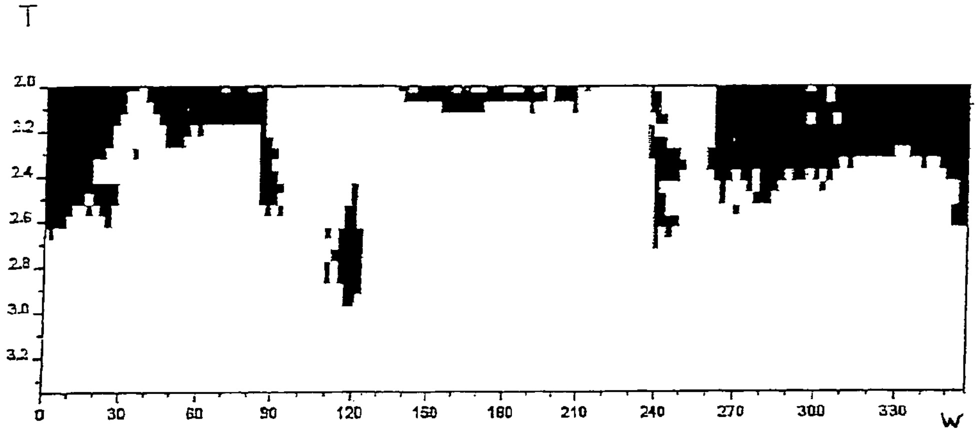
Figure 3:
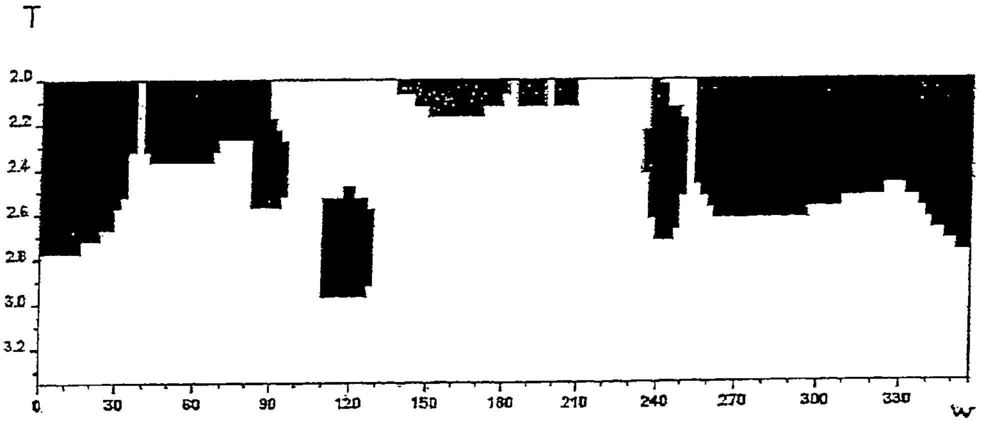
Figure 4:
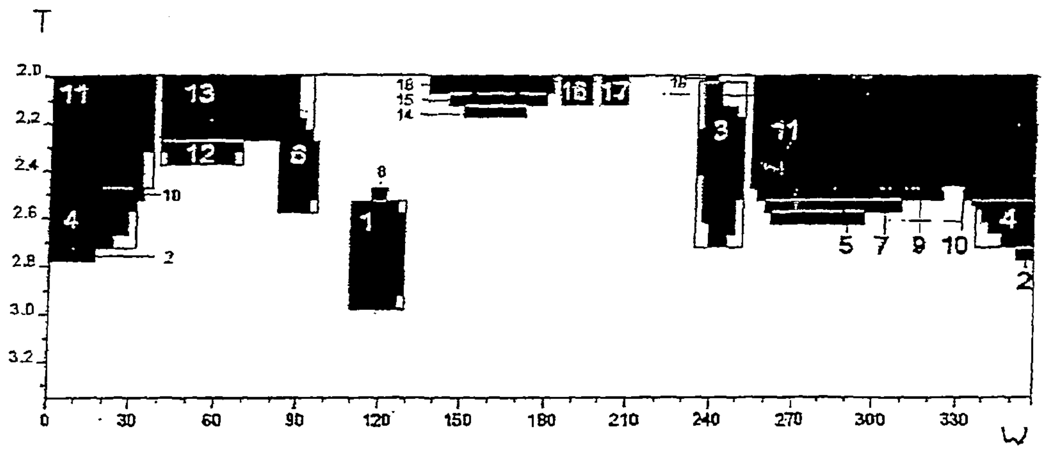
Figure 5:
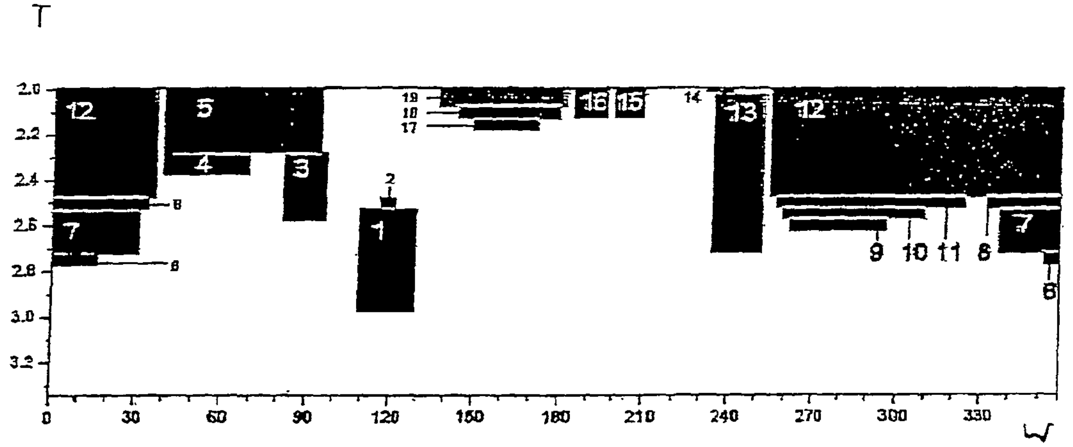

The invention will be exemplary described below in more detail with reference to the attached figures, wherein FIG. 1 shows a schematic view of a metallurgical vessel formed as an electric arc furnace, a measuring device for wear determination and a gunning device for repairing the refractory lining, FIG. 2 shows a cut-out of the binarized matrix reflecting the refractory lining of an electric arc furnace, FIG. 3 shows a cut-out of the defragmented matrix of the refractory lining of an electric arc furnace, FIG. 4 shows a cut-out of the segmented matrix of the refractory lining of an electric arc furnace, and FIG. 5 shows a cut-out of the sequenced matrix of the refractory lining of an electric arc furnace.

In particular, FIG. 1 shows a schematic view of a metallurgical vessel 1 formed as an arc furnace with a refractory lining 2 which requires a repair. A repair device 3 is provided for the repair of the lining 2 and is formed as a gunning device having a gunning head 4 and a manipulator 5. The gunning device pneumatically conveys a dry refractory mix through a nozzle 4*b* of the gunning head 4 and at the nozzle 4*b* water will be added to the refractory mix. It is also possible that the repair device is a shotcreting device. In contrast to the afore-mentioned gunning device the shotcreting device conveys a wet refractory mix through the shotcreting head with air and a reactive compound added to the wet refractory mix at the nozzle 4*b*. Manipulator 5 substantially includes a stationary column 5*a* rotatable about a vertical axis to the upper end of which an angular extension arm 5*b* is hinged. Gunning head 4 is suspended at the end of angular extension arm 5*b* facing away from column 5*a*. Extension arm 5*b* is pivotally supported about a horizontal axis at the upper end of column 5*a*. Gunning head 4 is pivotally supported about another axis which is substantially vertical and runs in parallel with the column 5*a*. Furthermore, gunning head 4 has a gunning arm 4*a* with a nozzle 4*b* that is pivotally mounted on gunning head 4. Thus, repair device 3 has four rotatory freedom degrees to allow a travel to the individual areas requiring a repair within metallurgical vessel 1. Drives (not shown) which are triggered via a control unit 6 for the repair procedure are provided to carry out the single rotational and pivotal motions of repair device 3. The control data referred to as repair data to perform the repair procedure are received by control unit 6 from a processing unit 7 which evaluates and processes relevant information from a measuring device 8. Measuring device 8 serves for determining the wear of refractory lining 2 and substantially includes a laser working in a non-contacting manner. For the measuring procedure measuring device 8, disposed at a free-end of a carrier arm 9, is moved over the opening 10 of the hot metallurgical vessel 1.

The residual thickness data determined by measuring device 8 are transferred from measuring device 8 to a processing unit 7. The processing unit 7 carries out the steps described herein before to process the residual thickness data received from the measuring device 8 into repair instructions for the repair device 3.

In FIG. 2, a binarized matrix is shown by way of example, the binarized matrix covers the depth range T of from 2 m to 3.6 m and the full angle range w (from 0° to 360°). The logical value "1", corresponding to areas which require repair, is represented in form of black areas and the logical value "0", corresponding to areas which do not require repair, is represented in form of white areas.

An example of a defragmented matrix of the identical cut-out is shown in FIG. 3. This matrix has been created by comparing the binary values of a number of areas within a larger square section and determining whether the number of black areas within that section exceeds a ratio of 60 percent. If the number exceeded the ratio of 60 percent, then the whole area was assigned the binary value "1"; if the number did not exceed the ratio of 60 percent, then the whole area was assigned the binary value "0". This procedure has been applied throughout the entire binarized matrix, and has been repeated 6 times, each time with increasing size of the enlarged sections.

FIG. 4 illustrates the same matrix in a segmented form. The segment borderings are shown as lines around the fields having the binary value "1". The method employed for segmentation analyzed a multiplicity of adjacent series of fields in the defragmented matrix. If an adjacent series of fields having the binary value "1" has been found in the actually traversed line, the borderings thereof were determined. The so identified area was transformed to a regular rectangle and assigned a consecutive number.

FIG. 5 illustrates the sequence of the repair procedure, starting from area assigned consecutive number 1. The sequence has been determined under consideration that vertically adjacent areas are repaired from bottom to top, and that the whole distance to be travelled by the manipulator is minimal.

The invention claimed is:

1. A method for repairing a protective lining of an industrial reaction or transport vessel including the steps of identifying areas of the lining having a thickness below a pre-determined threshold value by means of a measuring device, which measuring device measures the residual thickness of the lining and a processing unit, which processing unit in a first step transforms the residual thickness data into binary data, by comparing the measured residual thickness data with the predetermined threshold value for the thickness of the lining, and assigning the binary value "1" to areas of the lining having a thickness below the pre-determined threshold value, and the binary value "0" to areas of the lining having a thickness equal to or higher than the pre-determined threshold value, or vice versa, in a second step combines discrete isolated areas of the lining having a thickness below the pre-determined threshold value into adjacent combined areas of the lining to which the binary value for areas of the lining having a thickness below the predetermined threshold value is assigned such that an adjacent combined area has a portion which was identified in the first step as having a binary value which indicated that the portion had a measured residual thickness which was equal to or higher than the predetermined threshold value, and in a third step computes the position and repair sequence of each of the combined areas and transfers these data to a repair device, and applying monolithic lining material onto the combined areas computed by the processing unit by means of a repair device.

2. The method of claim 1, wherein the protective lining is a refractory lining.

3. The method of claim 1, wherein the industrial reaction or transport vessel is a metallurgical vessel.

4. The method of claim 3, wherein the metallurgical vessel is selected from a converter vessel an electric arc furnace, a blast furnace, a ladle, a tundish and a coke oven chamber.

5. The method of claim 4, wherein the ladle is selected from a steel casting ladle, pig iron ladle, torpedo ladle and slag ladle.

6. The method of claim 1, wherein the measuring device is a laser-based measuring device.

7. The method of claim 6, wherein the laser-based measuring device is a mirror scanner.

8. The method of claim 1, wherein the repair device comprises a manipulator arm and a gunning nozzle which is disposed thereon and is rotatable, tiltable and vertically movable.

9. The method of claim 8, wherein the repair device is selected from a spraying, a gunning and a shotcreting device.

10. The method of claim 1, wherein the processing unit is electronically connected with the measuring device and the repair device.

11. The method of claim 10, wherein steps within the processing unit are carried out electronically.

12. The method of claim 1, wherein the processing unit combines the isolated spots into rectangular combined areas.

13. The method of claim 12, wherein the position of each of the combined areas are computed in the form of cylinder coordinates.

14. The method of claim 1, wherein the residual thickness of the refractory lining is measured by the measuring device, after completion of the repair step, and these residual thickness data are compared with data obtained by a simulation regarding the achievable reconstitution of the refractory lining, and in case of a deviation between the newly measured residual thickness data and the simulation data, the control unit of the repair device is calibrated accordingly.

15. The method of claim 14, wherein the residual thickness of the refractory lining is measured by the measuring device, after completion of the repair step and these obtained residual thickness data are compared with data obtained by a simulation regarding the achievable reconstitution of the refractory lining, and in case of a deviation between the newly measured residual thickness data and the simulation data, the processing and repair sequence is repeated.

* * * * *